United States Patent [19]
Skoroszewski

[11] 3,983,202
[45] Sept. 28, 1976

[54] MANUFACTURE OF SYNTHETIC FIBERS AND YARNS
[75] Inventor: Wladyslaw H. Skoroszewski, Manchester, England
[73] Assignee: Shell Oil Company, Houston, Tex.
[22] Filed: Nov. 10, 1972
[21] Appl. No.: 305,625

Related U.S. Application Data
[63] Continuation of Ser. No. 48,231, June 22, 1970, abandoned.

[30] Foreign Application Priority Data
June 26, 1969  United Kingdom............... 32365/69

[52] U.S. Cl.............................. 264/147; 264/164; 264/176 R; 264/210 R; 264/DIG. 47
[51] Int. Cl.²........................................... B29H 7/18
[58] Field of Search .......... 264/210, 176, 178, 164, 264/147, DIG. 47; 57/34, 151, 167; 156/229, 160, 167, 244; 28/1

[56] References Cited
UNITED STATES PATENTS
| | | | |
|---|---|---|---|
| 2,327,087 | 8/1943 | Austin........................... | 264/DIG. 47 |
| 3,085,292 | 4/1963 | Kindseth..................... | 264/DIG. 47 |
| 3,347,727 | 10/1967 | Bobkowicz et al. ................ | 156/244 |
| 3,414,444 | 12/1968 | Bobkowicz et al. ............... | 156/62.4 |
| 3,496,044 | 2/1970 | Rowland............................. | 156/229 |
| 3,500,627 | 3/1970 | Kim ....................................... | 57/140 |
| 3,548,581 | 12/1970 | Bobkowicz et al. ..................... | 57/34 |
| 3,567,545 | 3/1971 | Bobkowicz et al. ................. | 156/229 |
| 3,608,042 | 9/1971 | Rasmussen...................... | 264/177 R |
| 3,672,013 | 6/1972 | Vernon et al....................... | 264/154 |
| 3,697,636 | 10/1972 | Skoroszewski et al....... | 264/DIG. 47 |

FOREIGN PATENTS OR APPLICATIONS
244,730  10/1960  Australia............................. 264/210

Primary Examiner—Jay H. Woo

[57] ABSTRACT

An improved process for the manufacture of fibers and yarns comprises drawing a sheet-like moss (web) of molecularly-orientable organic polymer at a temperature above its crystalline melting point, profiling said web followed by stretching and fibrillation of the web into filaments, the improvement comprising the intermediate step before stretching that the profiled polymer is chilled to a temperature below the crystalline melting point of the polymer and subjected to melt draw-down between the profiling element and movable chilling element.

3 Claims, 1 Drawing Figure

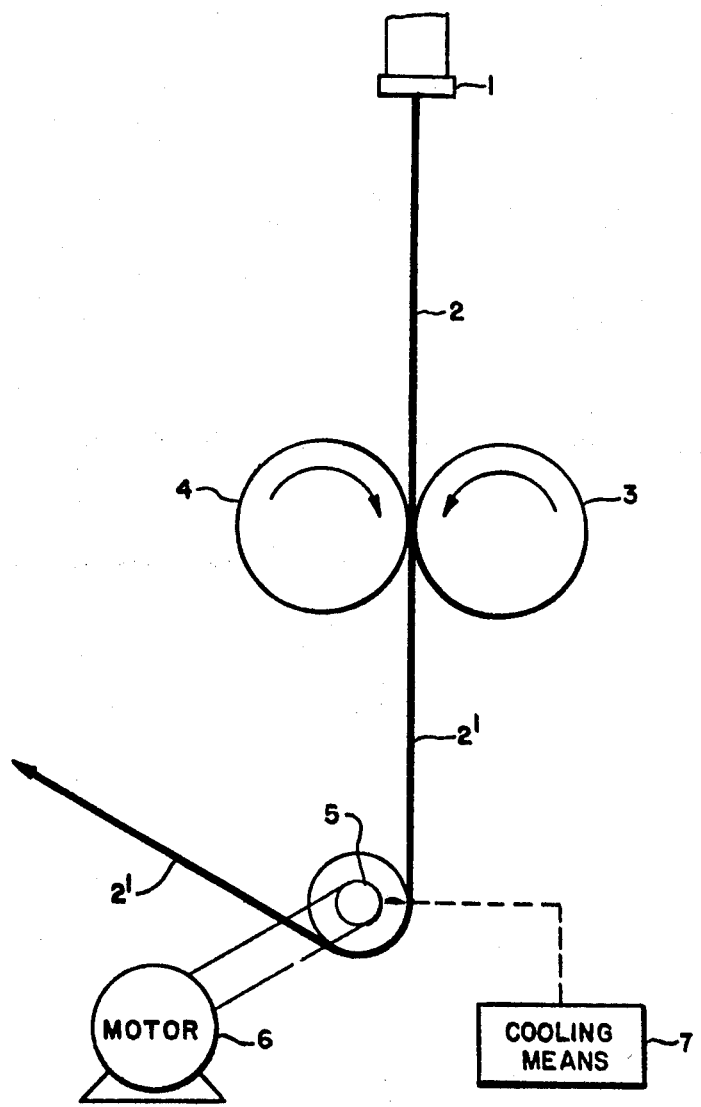

MANUFACTURE OF SYNTHETIC FIBERS AND YARNS

This is a continuation of application Ser. No. 48,231, filed June 22, 1970, now abandoned.

The present invention is concerned with an improved process for the manufacture of synthetic fibers and yarns.

U.S. Pat. No. 3,672,013 of B. J. Vernon and W. H. Skoroszewski issued June 27, 1972, discloses a process for the manufacture of synthetic fibers, which comprises bringing a sheet-like mass of a molecularly-orientable organic polymer at a temperature above its crystalline melting point into pressure contact with a profiling element to form a profiled polymer web having a plurality of longitudinal grooves disposed in close but spaced apart relationship in at least one surface thereof, said profiling element having a plurality of closely-spaced, parallel, surface ridges each having inwardly directed sides leading to a peak; chilling the profiled web during and/or after contact with said profiling element to a temperature below the crystalline melting point of the polymer, stretching the chilled, profiled web to effect orientation thereof, the chilled web being subjected during and/or after stretching, to conditions resulting in a controlled fibrillation thereof to form the synthetic fibers. The term "fibrillation" herein refers to the splitting of a stretched film into a regular or irregular network of fibers.

It has now been found, in accordance with the present invention that the profiled web of a molecularly-orientable organic polymer, for example, polyolefin and olefin copolymers (the term "polymer" including a polymer composition), at a temperature above the crystalline melting point of the polymer, can be drawn-down in the melt to a smaller cross-sectional area prior to chilling to a temperature below the crystalline melting point of the polymer.

According to one aspect of the present invention a process for the manufacture of synthetic fibers is provided, as an improvement in the process disclosed in the aforesaid U.S. Pat. No. 3,672,013, which comprises bringing a sheet-like mass of a molecularly-orientable organic polymer at a temperature above its crystalline melting point into pressure contact with a profiling element to form a profiled polymer web having a plurality of longitudinal grooves disposed in close but spaced apart relationship in at least one surface thereof, said profiling element having a plurality of closely-spaced, parallel, surface ridges each having inwardly directed sides leading to a peak, chilling the profiled web and stretching to effect orientation thereof, the chilled web being subjected during and/or after stretching to conditions resulting in a controlled fibrillation thereof to form the required synthetic fiber, wherein the profiled web which may be partially chilled, is chilled to a temperature below the crystalline melting point of the polymer by contacting an ungrooved surface of said web with a movable element adapted to chill said web and to impart a drawing movement thereto with respect to the profiling element such that said web, between said profiling element and said moving element is subjected to melt draw-down.

The degree of draw-down may be varied within quite wide limits, and in this way it is possible to obtain profiled webs of various cross-sectional areas from a given profiling element. For this reason the process in accordance with the present invention may be regarded as having a greater flexibility than the process described in U.S. Pat. No. 3,672,013. Another advantage of the present invention is that profiled webs of quite small cross-sectional area may be obtained using a profiling element having surfaces ridges which, in the absence of draw-down, would form a profiled web of larger, for example, appreciably larger cross-sectional area. Such profiling elements are usually easier and cheaper to manufacture than those having smaller and more closely-spaced ridges, and in fact known methods of manufacturing profiling elements in the form of steel rolls, which is the form which will normally be used in carrying out the process of U.S. Pat. No. 3,672,,013. place a practical limitation on the extent to which the pitch of the ridges can be reduced.

According to a further aspect of the present invention apparatus suitable for use in the manufacture of synthetic fibers is provided, which is an improvement in the apparatus of U.S. Pat. No. 3,672,013 which comprises a web profiling unit, means for stretching uniaxially a profiled polymer web from said profiling unit and for subjecting a stretched web to a fibrillation treatment, said web profiling unit comprising a profiling element having a plurality of closely-spaced, parallel, surfaces ridges each having inwardly directed sides leading to a peak and the sides of adjacent ridges forming troughs, for example, having concavely-shaped bottoms, and means for effecting pressure contact between the moving web of polymer at a temperature above its crystalline melting point and said profiling element, the improvement in said web profiling unit comprising:

a movable element, said movable element being disposed to contact the non-profiled surface of said web;

cooling means, said cooling means being disposed in heat transfer relation to said movable element to cool said profiled web; and drive means operably coupled to said movable element to draw said profiled web from the profiling element.

The present invention also includes a web profiling unit per se, and in particular a web profiling unit, which comprises a pair of cooperating rotatable rollers, or the like, having non-yielding surfaces, at least one of said rollers or the like being adapted to be driven and having a plurality of closely-spaced, parallel, surface ridges each having inwardly directed sides leading to a peak, and means for biasing said rollers or the like towards one another to form a nip, to profile on surface of the web, the improvement comprising:

a movable element, said movable element being disposed to contact the non-profiled surface of said web;

cooling means, said cooling means being disposed in heat transfer relation to said movable element to cool said profiled web; and drive means operably coupled to said movable element to draw said profiled web from the profiling element.

Except insofar as the present invention provides the additional feature of effecting a melt draw-down of the profiled web as described herein, the manner in which the present invention may be carried out is described in U.S. Pat. No. 3,672,013 incorporated herein by reference.

In the process according to the invention any thermoplastic material may be used which in the form of a web acquires molecular orientation by stretching, for example, homo- and copolymers of vinyl chloride, vinylidene chloride, vinyl acetate, acrylonitrile, polyesters and polyamides. Preferred starting materials are homo- and copolymers of lactones, in particular polypivalolactone, and homo- and copolymers of mono-olefins such as ethylene and propylene, and especially low-pressure polyethylene and polypropylene, or other polymers of alpha-monoolefins, especially of $C_2$ to $C\alpha$ monoolefins, which are at least about 50% crystalline, including so-called high density polyethylene and steroregular polypropylene.

In carrying out the present invention the movable element may be a continuous belt or a roller, for example, similar to the chill roller used in the conventional film casting process. Such a roller may be drivably mounted in a position below the profiling element such that the hot, profiled web travels substantially vertically downwards to impinge tangentially on the roller surface with which it remains in contact for a period sufficient for the required drawing movement to be imparted to it. The moving (movable) element — more desirably in the form of a roller, preferably also effects complete chilling of the web to the solid state, and preferably to a temperature well below the crystalline melting point of the polymer. However, a measure of chilling may be applied to the profiled web, for example, between the profiling element and the moving (movable) element to effect a partial cooling of one surface only of the web, which advantageously may be the grooved surface thereof; this may assist in preventing deformation of the grooves by melt flow. Also, by cooling one surface of the web as just described the draw-down operation may also impart to the web texturising or self-crimping characteristics. The required partial cooling may be achieved in any convenient manner, for example, by appropriate selection of the operating temperatures of the profiling element and/or the backing element which cooperates therewith to form a nip in which the web is profiled, or by the provision of separate cooling means, for example, an air blast directed against one surface of the profiled web, or by a combination thereof. Where the moving (movable) element is a roller this may be internally water-cooled so as to run at a relatively low surface temperature, for example, of the order of 15°C. Advantageously, the process is carried out using a grooved roller as a profiling element, the grooved roller cooperating with a plain pressure roller. For example, when the polymer is polypropylene, the grooved roller may be run at a surface temperature up to about 150°C, for example, from about 40° to 100°C and the plain roller may be run at a surface temperature of about 100°C. These temperatures are quoted by way of illustration; optimum roller temperatures will depend on the nature of the polymer, for example, and whether self-crimping properties are required, and may be determined by trial for the operating conditions employed, bearing in mind that the major part of the profiled web between the profiling element and the movable (or moving) element should be at a temperature above the crystalline melting point of the polymer. To this extent provision for heating or cooling the rollers, as required, is advantageously made.

In carrying out the present invention the degree of melt draw-down achieved will depend on the difference in speed (rate of surface movement) of the profiling and moving (or movable) elements, and provision may be made for changing their relative speeds to suit the type of polymer used, the kind of profiled web formed and, of course of reduction in the cross-section of the profiled web. The latter can vary quite widely, for example, a 10–30 percent reduction is readily achieved, and reductions of up to 50 percent or more may be obtained. The conditions as they apply to a particular molecularly-oriented polymer will be selected within the limits defined herein such that the resulting chilled film is brittle, and is spontaneously fibrillatable by cleavage along the groove lines after it has been stretched, i.e., at least a major part of the fibrillation occurs spontaneously.

If desired, provision may be made for adjusting the distance between the profiling element and the moving (movable) element in order to facilitate the attainment of optimum draw-down conditions.

The present invention may be illustrated with reference to the accompanying drawing which shows diagrammatically one way of carrying it out.

Referring to the drawing, a conventional slot-die extrusion head 1 forms a hot, extruded web 2 of polymer at a temperature above the crystalline melting point thereof. The web 2 flows downwardly into the nip formed between a profiling element in the form of a ridged roller 3 and plain backing roller 4. The rollers 3 and 4 form part of a profiling unit which, with the exception hereinafter referred to, is generally similar to that of U.S. Pat. No. 3,672,013. Mounted below the roller 4 is a movable element in the form of a driven roller 5 which is rotated, by means of a variable speed drive, from the driving means 6, e.g., motor, of the profiling unit. Advantageously, the roller 5 may be mounted in a position such that the profiled web $2^1$ moves substantially vertically downwards from the nip between rollers 3 and 4 to contact the roller 5 tangentially, the ungrooved surface of the web $2^1$ contacting the roller 5 to avoid damage to the grooves of the web $2^1$. In operation, the roller 5 is rotated by drive means 6 at a higher speed than the roller 3 so as to impart a drawing movement to the web $2^1$ resulting in a reduction in the cross-sectional area thereof to an extent which depends on the difference in speed between the rollers 3 and 5. Cooling means 7 are provided for cooling the roller 5 internally so that the web $2^1$ leaves the roller 5 in the solid state and at a temperature at which it can be handled easily without risk of breakage or distortion.

After contacting the roller 5 the web $2^1$ passes, via idler rollers if required, through a conventional stretching operation comprising a first standard Godet unit, a standard heating oven followed by a second Godet unit which runs at a higher speed than the first Godet unit to stretch the web and effect molecular orientation thereof, as described in U.S. Pat. No. 3,672,013. The mechanical forces during stretching and/or passing through the second Godet unit resulting in controlled fibrillation of the web to form fibers. Typical stretch ratios employed for polypropylene, e.g., are between 5:1 and 12:1 and more; the oven can be operated at a temperature of the order of about 140°–150°C.

The present invention is further illustrated by the following example:

EXAMPLE

Polypropylene fibers were manufactured in accordance with the present invention using machinery comprising a profiling unit, including movable element, as just described and conventional stretching equipment. A web of molten polypropylene of melt index 3.5 was extruded at about 290°C from a conventional 10 inch (wide) slot-die orifice (lip separation:0.025 inch) into the nip of rollers 3 and 4 which, in operation, were maintained at about 30°C and about 100°C respectively. The roller 5 was maintained at about 15°C, and the ratio of the rotational speed of the roller 5 to that of roller 3 was such as to achieve a 25 percent reduction in the cross-sectional area of the profiled polypropylene web by melt draw-down thereof. The resulting profiled web leaving the rollers was passed to the first Godet set of the stretching unit. The latter was operated with a stretch ratio of 8:1 and at an oven (i.e. stretching) temperature of 145°C. The stretched web was taken off at a speed of 240 feet per minute and a complete breakdown into individual filaments had occurred as a result of a controlled fibrillation of the web by the time it left the second Godet set. The average denier of the fibers was 22.

I claim as my invention:

1. In the process for the manufacture of synthetic fibers of regular dimension and substantially free from whiskers which comprises bringing a sheet-like mass of a molecularly-orientable thermoplastic material at a temperature above its crystalline melting point into pressure contact with a profiling element to form a profiled polymer web having a plurality of longitudinal grooves disposed in close but spaced apart relationship in at least one surface thereof, said profiling element having a plurality of closely spaced, parallel, surface ridges each having inwardly directed sides leading to a peak, chilling the profiled web and stretching to effect orientation thereof, and subjecting the profiled molecularly oriented web to a controlled fibrillation to form said synthetic fibers, the improvement which comprises contacting the ungrooved surface of the profiled web while above its crystalline melting point with a chill roller which is drivably mounted in a position below the profiling element such that the profiled web travels substantially vertically downwards to impinge tangentially on the roller surface, thereby chilling the profiled web to a temperature below the melting point of the polymer, while at the same time imparting a drawing movement to the web parallel with the direction of extrusion between the profiling element and the chill roller, thereby subjecting the web to a melt draw-down parallel to the direction of extrusion and reducing the cross-sectional area of the profile web.

2. A process as in claim 1 in which a measure of chilling is applied to the profiled web between the profiling element and the movable element.

3. A process as in claim 1 in which the polymer is polypropylene or high density polyethylene.

* * * * *